(12) United States Patent
Mendenhall et al.

(10) Patent No.: US 12,228,775 B2
(45) Date of Patent: Feb. 18, 2025

(54) FIBER OPTIC CONNECTOR PUSH-PULL BOOT WITH SELF-LOCKING BOOT LATCH

(71) Applicant: US Conec Ltd., Hickory, NC (US)

(72) Inventors: Scott Mendenhall, Hickory, NC (US); Jason Higley, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 223 days.

(21) Appl. No.: 17/982,604

(22) Filed: Nov. 8, 2022

(65) Prior Publication Data
US 2023/0145020 A1 May 11, 2023

Related U.S. Application Data

(63) Continuation of application No. 29/814,639, filed on Nov. 8, 2021, now Pat. No. Des. 1,031,670.

(60) Provisional application No. 63/276,826, filed on Nov. 8, 2021.

(51) Int. Cl.
*G02B 6/38* (2006.01)
(52) U.S. Cl.
CPC ......... *G02B 6/3893* (2013.01); *G02B 6/3825* (2013.01); *G02B 6/3869* (2013.01)
(58) Field of Classification Search
CPC .................................................. G02B 6/3893
See application file for complete search history.

(56) References Cited

U.S. PATENT DOCUMENTS

| | | |
|---|---|---|
| D330,538 S | 10/1992 | Meyer |
| 8,834,038 B2 | 9/2014 | Limbert et al. |
| 9,720,188 B2 | 8/2017 | Barwicz et al. |
| 9,958,621 B2 | 5/2018 | Wong et al. |
| 10,712,512 B2 | 7/2020 | Ho et al. |
| 11,112,567 B2 | 9/2021 | Higley et al. |
| 2004/0247252 A1* | 12/2004 | Ehrenreich .......... G02B 6/3893 385/58 |
| 2006/0067631 A1 | 3/2006 | Wang et al. |
| 2014/0153877 A1 | 6/2014 | Isenhour et al. |

(Continued)

FOREIGN PATENT DOCUMENTS

WO 2021050075 A1 3/2021

OTHER PUBLICATIONS

Extended European Search Report for EPO App. No. 22206005.5, dated Mar. 28, 2023, 7 pages.

*Primary Examiner* — Michael Stahl
(74) *Attorney, Agent, or Firm* — Michael L Leetzow PLLC; Shubhrangshu Sengupta

(57) ABSTRACT

A fiber optic connector includes a connector body, a release member attached to the connector body and having a boot latch opening at a rear end, a push-pull boot attached to the release member, and a boot latch attached to the push-pull boot and extending forward and away from the push-pull boot, the boot latch having a first and second side extension and a central head member connected to and at least partially disposed between the first and the second side extensions by at least one flexure member, the boot latch is permanently disposed within the release member after the boot latch is inserted into the boot latch opening as the central head member engages each of the first side extension and the second side extension preventing removal of the boot latch from the release member when push or pull forces are applied to the push-pull boot.

20 Claims, 16 Drawing Sheets

(56) References Cited

U.S. PATENT DOCUMENTS

| | | |
|---|---|---|
| 2014/0205257 A1 | 7/2014 | Durrant et al. |
| 2017/0192181 A1 | 7/2017 | Barwicz et al. |
| 2019/0204513 A1* | 7/2019 | Davidson .............. G02B 6/3825 |
| 2020/0278502 A1* | 9/2020 | Van Baelen .......... G02B 6/3887 |
| 2021/0191053 A1 | 6/2021 | Cloud et al. |
| 2021/0281005 A1 | 9/2021 | Taira et al. |
| 2021/0302665 A1* | 9/2021 | Gandla .............. H01R 13/6272 |
| 2023/0145020 A1 | 5/2023 | Mendenhall et al. |

* cited by examiner

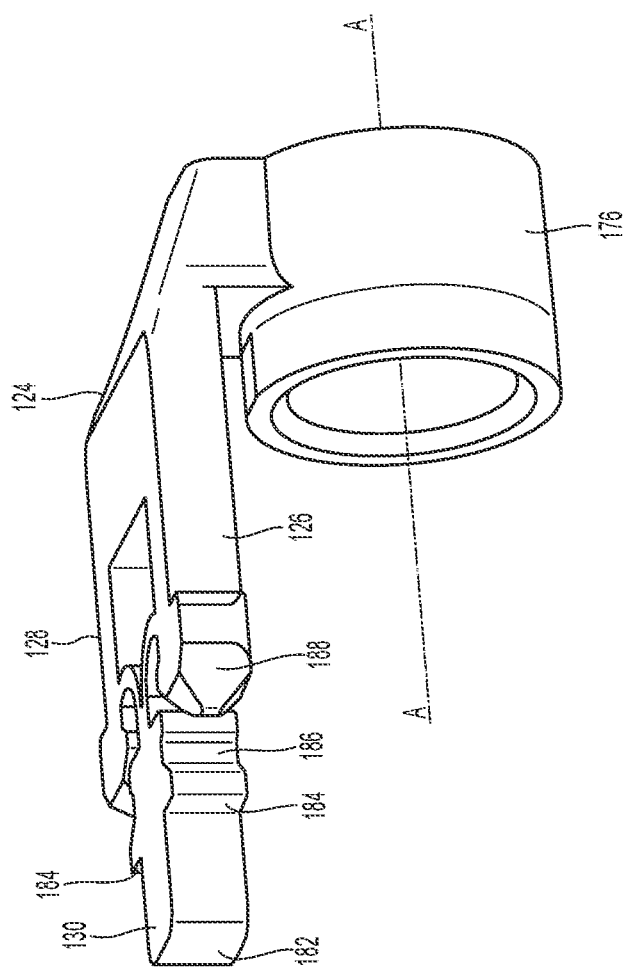
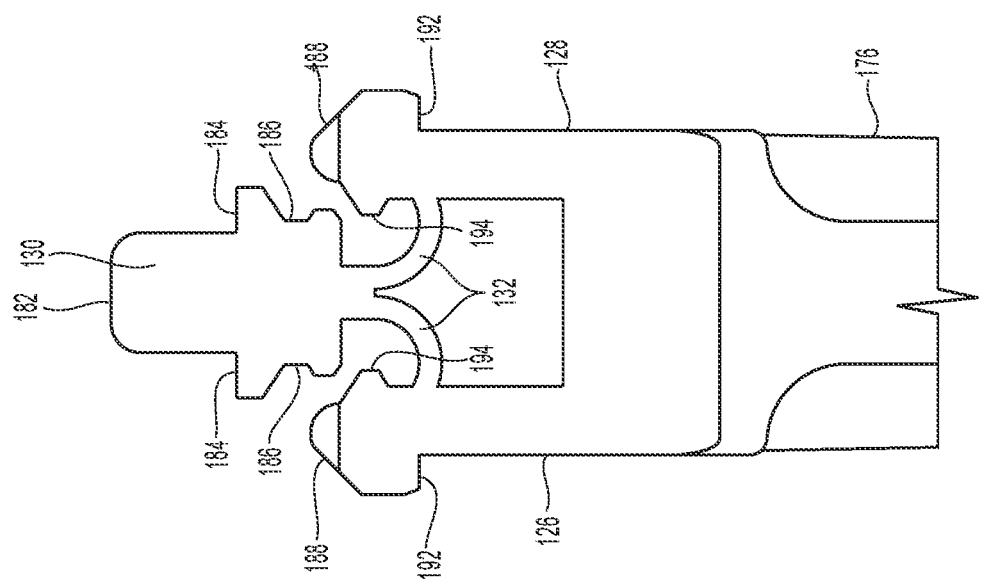
Fig. 7B
Fig. 7A

FIBER OPTIC CONNECTOR PUSH-PULL BOOT WITH SELF-LOCKING BOOT LATCH

REFERENCE TO RELATED CASE

This application claims priority under 35 U.S.C. § 119 (e) to U.S. provisional application No. 63/276,826 filed on Nov. 8, 2021, and under 35 U.S.C. § 120 to U.S. Design Patent Application 29/814,639, filed on Nov. 8, 2021, the contents of which are hereby incorporated by reference in their entirety.

BACKGROUND OF THE INVENTION

Many optical connectors have connector latches that attach the optical connector to an adapter. The connector latch mechanism may be actuated by a conventional release member. Typically, this release member is depressed to release the latching mechanism, and hence the optical connector, from the adapter. The release member may be depressed using the user's thumb or fingers, and/or using a push-pull stick attached to the release member. Examples of such conventional release members and legacy push-pull tab/stick techniques are shown in U.S. Pat. Nos. 9,958,621 and 10,712,512. However, push-pull sticks consume space and are not preferred in high density connector environments for various reasons.

To move away from the push-pull sticks, the optical connector industry is adopting various push-pull boots that allow the optical connector to be attached to or removed from the adapter. One such example push-pull boot (without the aforementioned release member) is disclosed in Applicant's U.S. Pat. No. 11,112,567. These push-pull boots are bendable and flexible in any direction away from the longitudinal axis.

Yet another type of push-pull boot that does away with the push-pull stick or tab is shown in Applicant's US Patent Publication No. 2021/0191053. However, this push-pull boot is detachable from the MPO connector and is intentionally designed to be so.

In some technical applications, there is a need to have push-pull boots that can be attached to the aforementioned release member. However, in those applications it is desirable to have the push-pull boot stay attached to the release member and not be detachable. In such cases, the push-pull boot needs to be able to withstand pulling forces by the user in order to release the optical connector from the adapter, but not completely detach from the optical connector. However, the flexible material of the push-pull boot may prevent the push-pull boot from staying attached to the release member. Accordingly, there is a need for a push-pull boot that provides for the benefits of a rigid push-pull stick without occupying as much space, but is also not detachable and does not increase the assembly part count like the push-pull stick.

SUMMARY OF THE INVENTION

According to one aspect, the present invention is directed to a fiber optic connector that includes a ferrule configured to support at least one optical fiber, a plug at least partially surrounding the ferrule, a connector latch attached to the plug to engage the fiber-optic connector with an adapter or with a receptacle, a connector body attached to the plug, a release member attached to the connector body and to the connector latch and having a boot latch opening at a rear end, a push-pull boot attached to the release member, and a boot latch attached to the push-pull boot and extending forward and away from the push-pull boot, the boot latch having a first side extension and a second side extension and a central head member connected to and at least partially disposed between the first side extension and the second side extension by at least one flexure member, wherein the boot latch is permanently disposed within the release member after the boot latch is inserted into the boot latch opening as the central head member engages each of the first side extension and the second side extension preventing removal of the boot latch from the release member when a push force or a pull force is applied to the push-pull boot.

In some embodiments, the fiber optic connector includes a connector body, a release member attached to the connector body and having a boot latch opening at a rear end, a push-pull boot attached to the release member, and a boot latch attached to the push-pull boot and extending forward and away from the push-pull boot, the boot latch having a first side extension and a second side extension and a central head member connected to and at least partially disposed between the first side extension and the second side extension by at least one flexure member, wherein the boot latch is permanently disposed within the release member after the boot latch is inserted into the boot latch opening as the central head member engages each of the first side extension and the second side extension preventing removal of the boot latch from the release member when push or pull forces are applied to the push-pull boot.

In some embodiments, the central head member is in a first position relative to the first side extension and the second side extension before the boot latch is inserted into the release member and the central head member is in a second position relative to the first side extension and the second side extension after the boot latch is inserted into the boot latch opening, the boot latch being retained in the release member as the central head member engages each of the first side extension and the second side extension preventing the boot latch from passing through the boot latch opening in the release member when push or pull forces are applied to the push-pull boot after the boot latch is inserted into the boot latch opening In some embodiments, the release member has at least one rearward facing surface to engage the central head member when the boot latch is inserted into the release member a predetermined distance.

In some embodiments, the boot latch opening has a chamfered surface on each side thereof and the first side extension and the second side extension have a side ramp that engages a respective chamfered surface on the boot latch opening, causing the first side extension and the second side extension to move toward one another as the boot latch is inserted into the opening.

In some embodiments, the at least one rearward facing surface engages a shoulder on the central head member.

In some embodiments, the central head member has a recessed portion on opposing sides to receive an inward projection from the first side extension and the second side extension, respectively.

In some embodiments, the inward projection on each of the first side extension and the second side extension are disposed within the recessed portions thereby preventing the first side extension and the second side extension from moving toward each other when force is applied to the boot latch.

In yet another aspect, there is a push-pull boot for use with a fiber optic connector having at least one fiber optic ferrule to support at least one optical fiber, the push-pull boot that includes a main body having a front end and a back end and defining a longitudinal axis between the front end and the back end, and a boot latch attached to the main body adjacent the front end of the main body and extending substantially parallel to the longitudinal axis and away from the back end of the main body of the push-pull boot, wherein the boot latch includes a first side extension and a second side extension and a central head member positioned between the first side extension and the second side extension, and wherein the first side extension and the second side extension and the central head member are engaged with each other in a locked state, and wherein upon an application of a rearward force to the push-pull boot to detach the fiber-optic connector from an adapter or a receptacle, the push-pull boot remains in an attached state with the fiber-optic connector.

In some embodiments, the push-pull boot has more rigidity in a direction substantially parallel to the longitudinal axis but has lesser rigidity and is bendable in a direction away from the longitudinal axis.

In yet another aspect, there is a combination of a release member and a push-pull boot for a fiber-optic connector that includes a release member removably attachable to a connector body and to a connector latch of the fiber-optic connector, the release member having a boot latch opening, and a push pull boot attached to the release member and configured to support a fiber optic cable containing at least one optical fiber, the push-pull boot having a boot latch attached to a front portion of the push-pull boot and extending forwardly substantially parallel to a longitudinal axis of the push-pull boot, wherein the boot latch is remains engaged with the release member inside the boot latch opening of the release member when pull forces are applied to the push-pull boot to detach the fiber optic connector from an adapter or a receptacle.

And in yet another aspect, there is a duplex fiber optic connector that includes a pair of ferrules each configured to support an optical fiber, a pair of plugs at least partially surrounding each of respective ones of the pair of ferrules, a connector latch attached to each plug in the pair of plugs to engage the fiber-optic connector with an adapter, a connector body attached to the pair of plugs, a release member attached to the connector body and to the connector latch and having a boot latch opening at a rear end, a push-pull boot attached to the release member, and a boot latch attached to the push-pull boot and extending forward and away from the push-pull boot, the boot latch having a first side extension and a second side extension and a central head member connected to and at least partially disposed between the first side extension and the second side extension by at least one flexure member, wherein the central head member is in a first position relative to the first side extension and the second side extension before the boot latch is inserted into the release member and the central head member is in a second position relative to the first side extension and the second side extension after the boot latch is inserted into the boot latch opening, the boot latch being retained in the release member as the central head member engages each of the first side extension and the second side extension preventing the boot latch from passing through the boot latch opening in the release member when push or pull forces are applied to the push-pull boot after the boot latch is inserted into the boot latch opening substantially along a longitudinal axis.

And there is also a combination of a release member and a push-pull boot for a fiber-optic connector, that includes a release member removably attachable to a connector body and to a connector latch of the fiber-optic connector, the release member having a boot latch opening, and a push pull boot attached to the release member and configured to support a fiber optic cable containing at least one optical fiber, the push-pull boot having a boot latch attached to a front portion of the push-pull boot and extending forwardly substantially parallel to a longitudinal axis of the push-pull boot, wherein the boot latch is remains engaged with the release member inside the boot latch opening of the release member when pull forces are applied to the push-pull boot to detach the fiber optic connector from an adapter or a receptacle.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 7A is a top view of the front end of push-pull boot showing the boot latch and with the central head member of the boot latch in a first position relative to the side extensions of the boot latch;

FIG. 7B is a side perspective view of the boot latch on the front of the push-pull boot;

DETAILED DESCRIPTION OF THE INVENTION

Figure 1:
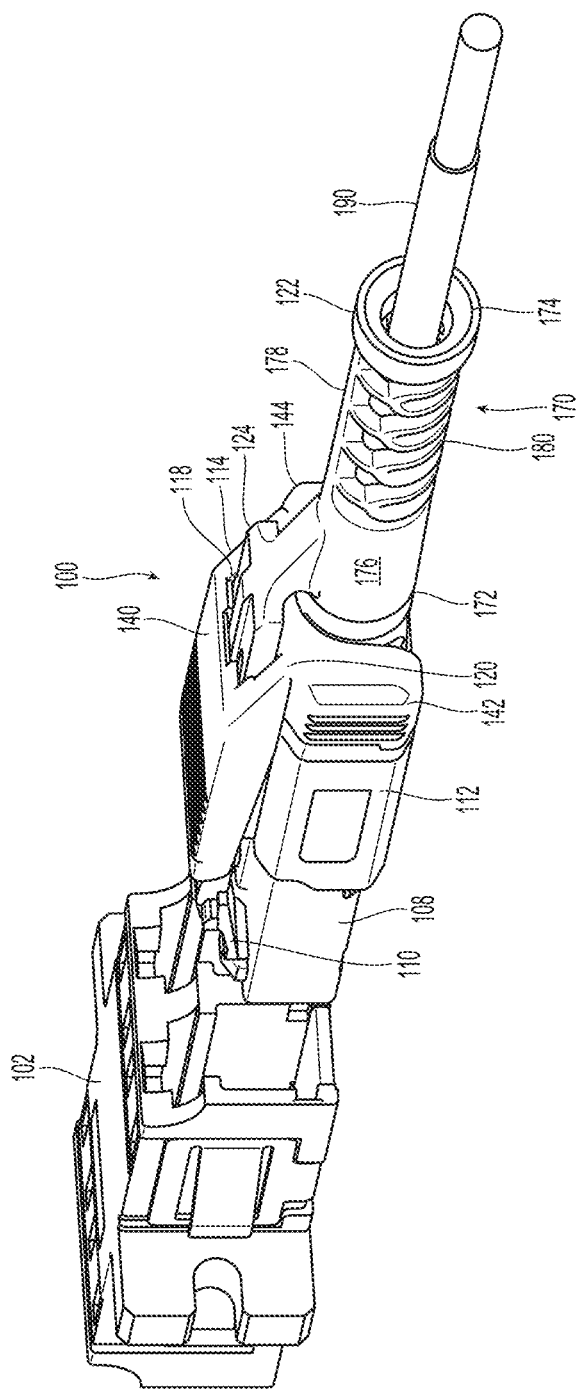
FIG. 1 is a perspective view of one embodiment of a fiber optic connector according to one embodiment of the present invention and an adapter into which the fiber optic connector can be inserted.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
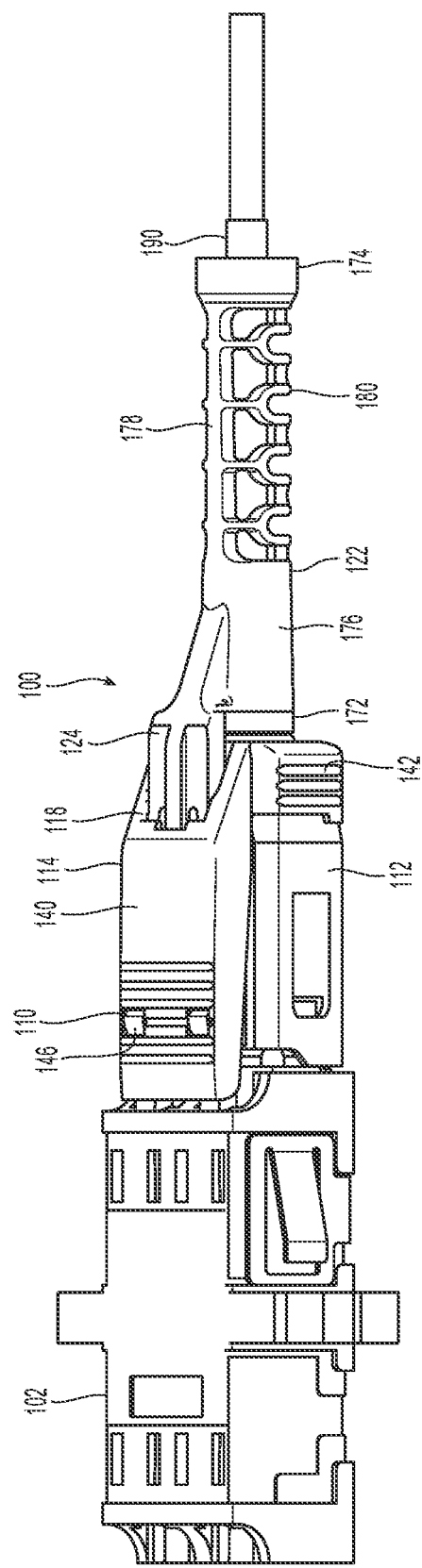
FIG. 2 is a perspective view the fiber optic connector inserted into the adapter illustrated in FIG. 1.
Figure 3:
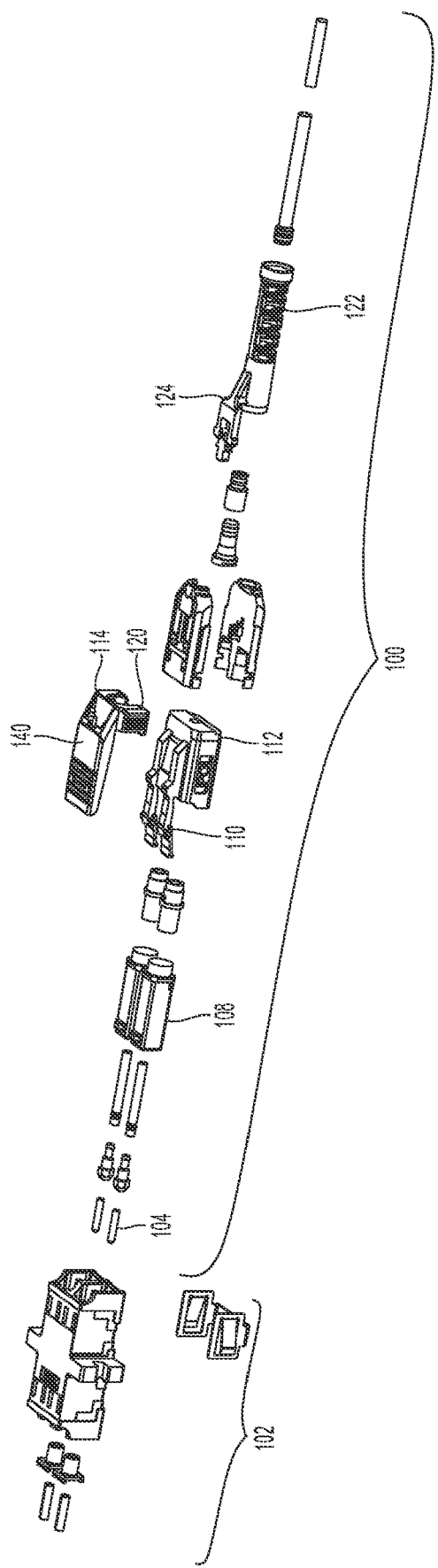
FIG. 3 is an exploded, perspective view of the fiber optic connector and adapter in FIG. 2.

Illustrated in FIGS. 1-3 is one embodiment of a fiber optic connector 100 according to the present invention, along with a representative adapter 102 into which the fiber optic connector 100 can be inserted. The adapter 102 may be inserted into a panel or other structure and still fall within the scope of the invention, or the adapter 102 may be another type of receptacle to receive the fiber optic connector 100 (e.g., a transceiver receptacle attached to a circuit board). The adapter 102 should also have at least the same number of openings as there are fiber optic connectors 100 to be inserted into the adapter/receptacle 102.

Applicant notes that in this disclosure the term "front" or "forward" means that direction where the fiber optic connector and/or the ferrule(s) therein would meet with another fiber optic connector or device (e.g., adapter), while the term "rear" or "rearward" is used to mean the direction from which the optical fibers enter into the fiber-optic connector or the ferrule. Each of the components will therefore have a front and rear, and the two respective fronts or forward portions of the fiber optic ferrules would engage one another. Thus, in FIG. 4, the "front" of the fiber optic connector and the push-pull boot is on the left side and "forward" is to the left and out of the page. "Rearward" or "rear" is that part of the fiber optic connector or push-pull boot that is on the right side of the page and "rearward" and "backward" is toward the right and into the page.

Figure 4:
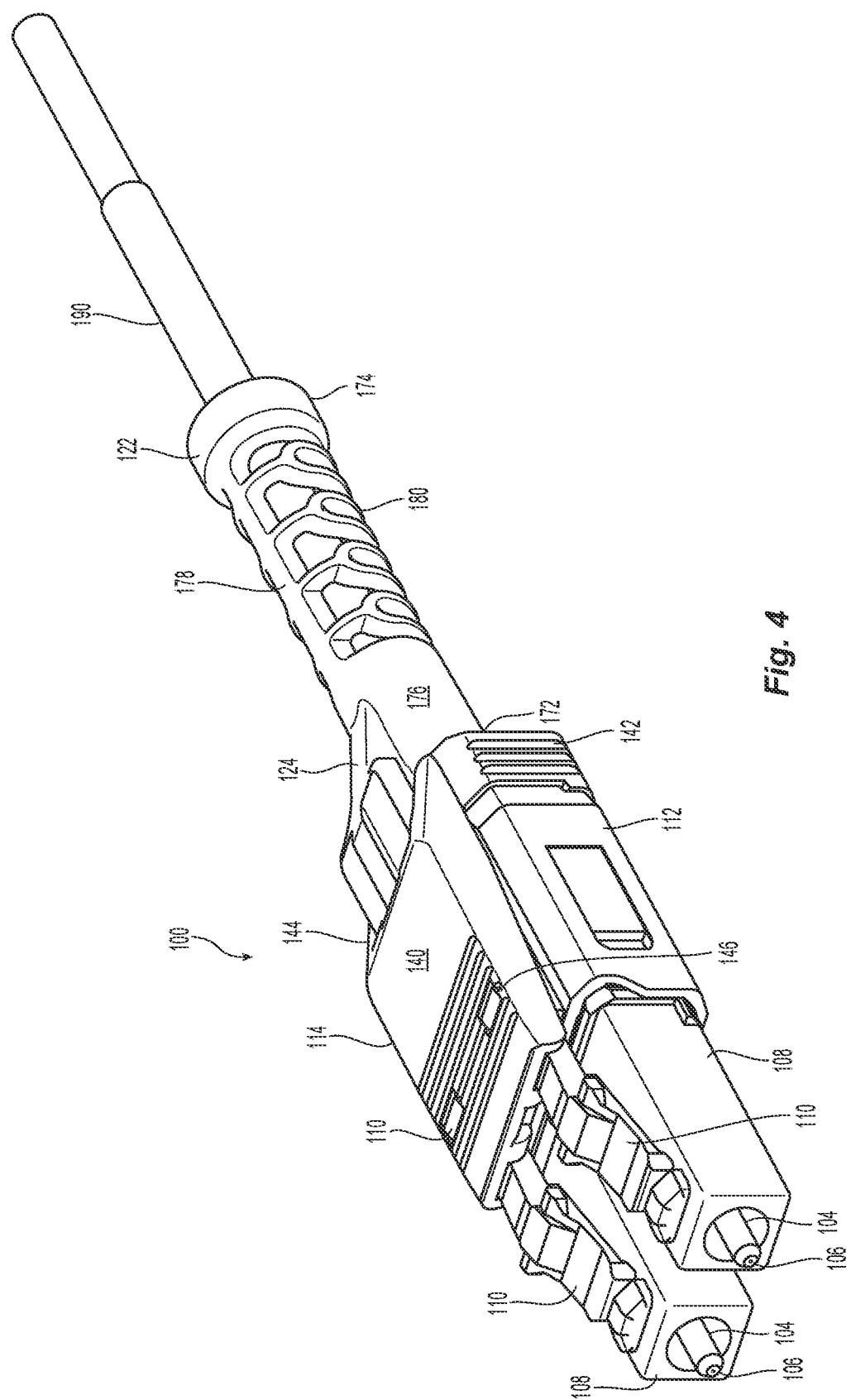
FIG. 4 is front perspective view of the fiber optic connector in FIG. 2.
Figure 5:
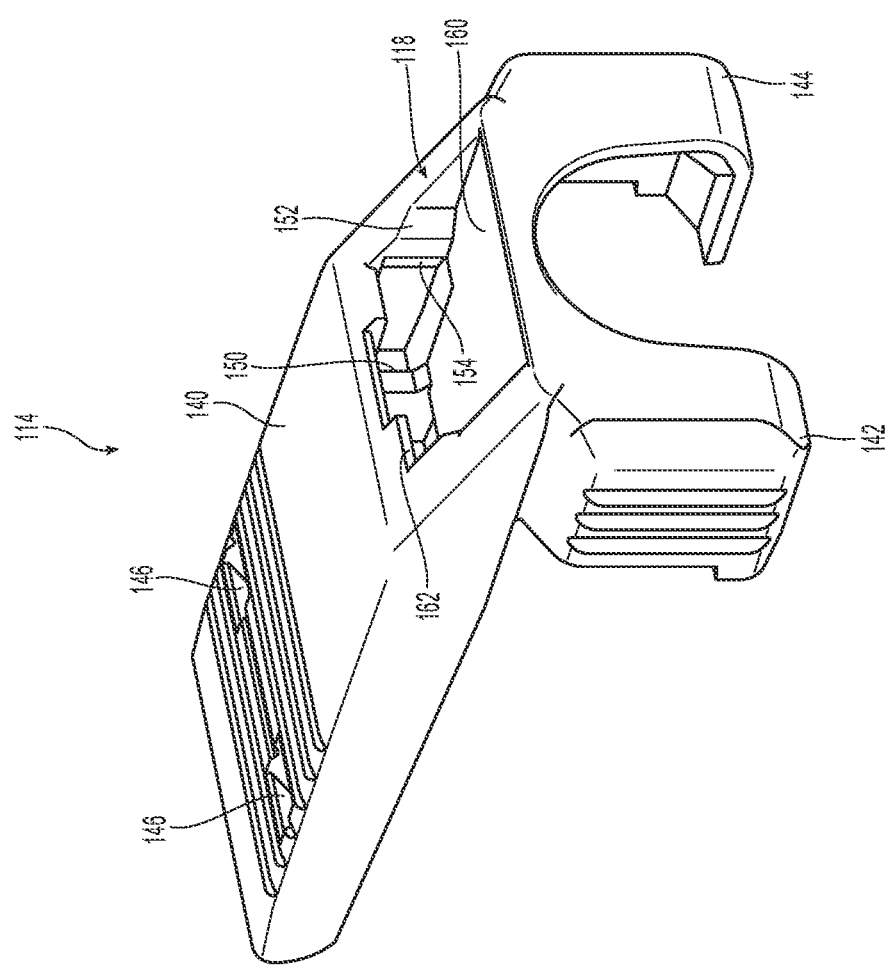
FIG. 5 is a rear perspective view of a release member used on the fiber optic connector in FIG. 2.
Figure 6:
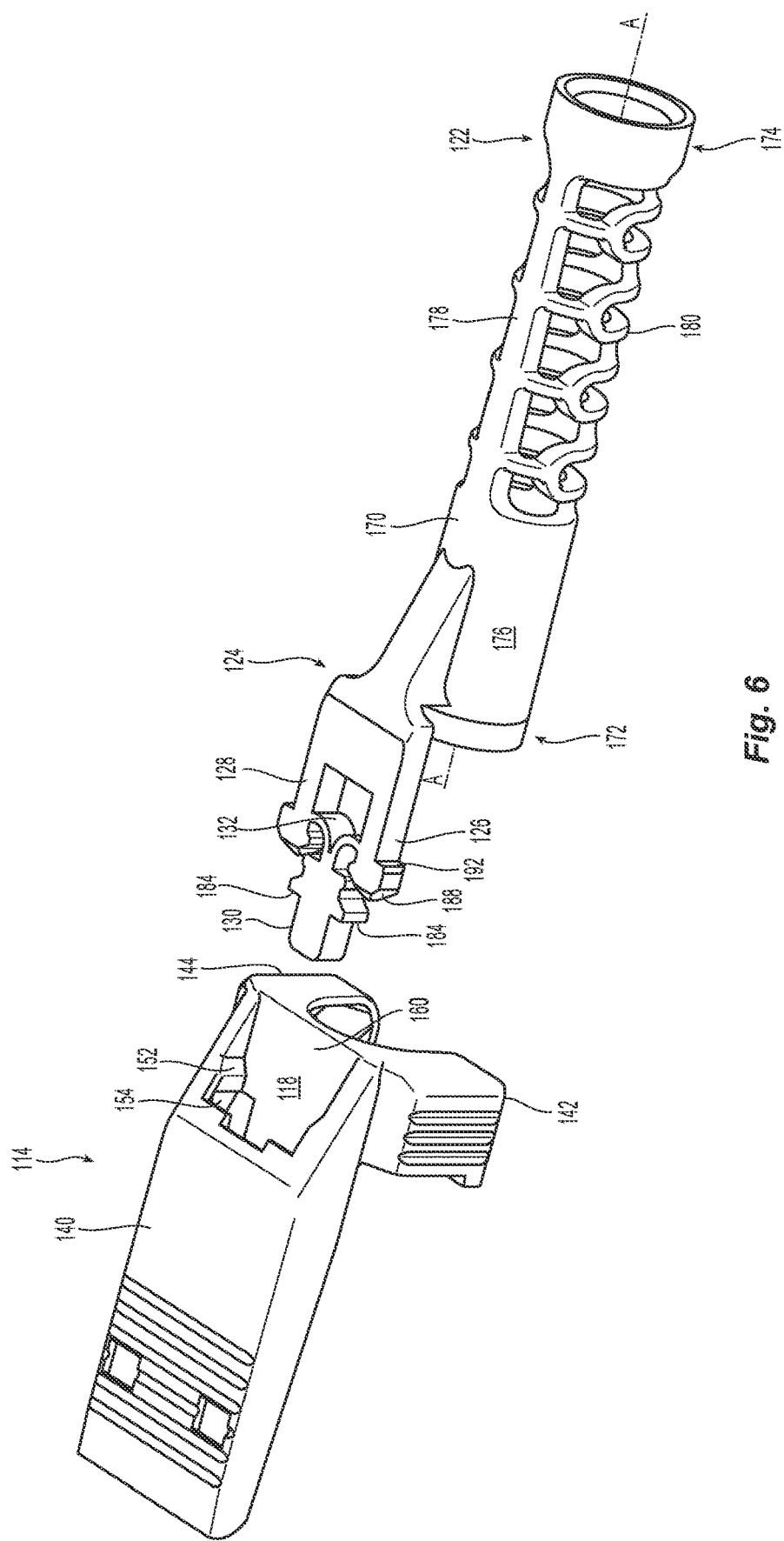
FIG. 6 is a perspective view of the release member and a push-pull boot of the fiber optic connector in FIG. 2.

The fiber optic connector 100 includes a number of components. Referring to FIGS. 3 and 4 in particular, some of these components include at least one ferrule 104 configured to support at least one optical fiber 106 and at least one plug 108 at least partially surrounding the ferrule 104. The illustrated fiber optic connector 100 has two of the ferrules 104 and plugs 108, making it a duplex connector. However, the present invention may have more or fewer ferrules 104/plugs 108 and still fall within the scope of the invention. For example there may be only one ferrule 104/plug 108 or there may be four ferrules 104/plugs 108. It therefore follows that the adapter 102 would have a corresponding structure to receive the appropriate number of ferrules 104/plugs 108. Further, in an alternative embodiment, the ferrules 104 may not each have a separate respective plug 108. Rather, the ferrules may be in a common housing surrounding the ferrules 104 with the end faces of the ferrules 104 exposed at the front.

The fiber optic connector 100 also includes a connector latch 110 attached to the plug 108 to engage the fiber optic connector 100 with the adapter or the receptacle 102 to retain the fiber optic connector 100 in the adapter 102 and keep the fiber optic connector 100 from falling out, while also allowing for mating with other fiber optic connectors 100. There is also a connector body 112 attached to the plug 108. The fiber optic connector 100 also includes a release member 114 that is attached to the connector body 112. The release member 114 engages with the connector latch 110. The release member 114 has a boot latch opening 118 at a rear end 120 thereto. The release member 114 attaches to a push-pull boot 122 as described herein below, the push-pull boot 122 has a boot latch 124 that is inserted into the boot latch opening 118 of the release member 114. The boot latch 124 extending forward (toward the ferrules 104) and away from the push-pull boot 122. As seen in FIGS. 6 and 7A-E, the boot latch 124 has a first side extension 126 and a second side extension 128 and a central head member 130 connected to and at least partially disposed between the first side extension 126 and the second side extension 128 by at least one flexure member 132. As noted in more detail below, the flexure member 132 is a flexible member that is deformable and pliable so as to allow the central head member 130 to move relative to the first side extension 126 and the second side extension 128. The first side extension 126 and the second side extension 128 are spaced apart from each other along a transverse direction, which is the same direction as the space between the exposed end-faces of the ferrules 104.

As discussed in more detail below, when the boot latch 124 is inserted into the release member 114 through the boot latch opening 118. The central head member 130 engages a surface within the release member 114, the central head member 130 will be permanently disposed between the first side extension 126 and the second side extension 128. By "permanently," it is meant that the boot latch 124 will not be removable from the fiber optic connector 100, and the release member 114 in particular, once in a fully assembled state with normal activities around the fiber optic connector 100. Applying more pressure/force than is standard (e.g., more than 80 N) may be able to break the boot latch 124 free. So too with excessively deforming the fiber optic connector 100 or any of its components. "Permanent" means that the boot latch 124, and thus the push-pull boot 122, is not intended removable once inserted unless components are broken, destroyed, or manipulated in a manner that is inconsistent with the typical handling of similar parts. Since the central head member 130 engages and locks with each of the first side extension 126 and the second side extension 128, the first side extension 126 and the second side extension 128 are prevented from moving inward towards each other, and the boot latch 124 cannot be removed from the release member 114 when a push force or a pull force is applied to the push-pull boot 122.

The release member 114 will be described in view of FIGS. 5-6 and 8-9. The release member 114 has a top member 140 and two sides 142, 144. The two sides 142, 144 engage the connector body 112. The top member 140 has openings 146 that accommodate a portion of the connector latch 110. When the push-pull boot 122 is pulled backward and away from the fiber optic connector 100, the release member 114 also moves backward thereby depressing the connector latches 110 and allowing the fiber optic connector 100 to be removed from the adapter 102. The engagement of the release member 114 with the connector body 112 may be different from the way that is illustrated in the figures. However, the boot latch opening 118 and the release member 114 have features that work with the boot latch 124 to keep the boot latch 124 within the release member 114 after installation. In particular, there are rearward facing surfaces/walls 150, a chamfered surface 152 at the boot latch opening 118, and a forward facing surface 154 adjacent to the chamfered surface 152. See FIGS. 8 and 9. The release member 114 has a base or floor 160 and a ceiling 162 on the underside of the top member 140 that partially define the boot latch opening 118 and keep the boot latch 124 within the release member 114. Illustrated in FIGS. 8 and 9, the rearward facing surfaces/walls 150 function to engage the central head member 130. As the boot latch 124 is inserted into the boot latch opening 118, the central head member 130 passes between the two rearward facing surfaces/walls 150, but shoulders 184 on the central head member 130 engage the two rearward facing surfaces/walls 150 and the central head member 130 moves rearwardly relative to the first side extension 126 and the second side extension 128. See again FIGS. 7A-7E.

Focusing now on the push-pull boot 122, the push-pull boot 122 has a main body 170 that has a front end 172 and a back end 174 and defines a longitudinal axis A between the front end 172 and the back end 174. See, e.g., FIGS. 1-2, 4 and 6. The push-pull boot 122 is attached to the release member 114. The push-pull boot 122 also has the boot latch 124 attached to the main body 170 adjacent the front end 172 of the main body 170 and extending substantially parallel to the longitudinal axis A and away from the back end 174 of the main body 170 of the push-pull boot 122. As illustrated, the front end 172 of the push-pull boot 122 has a solid tubular portion 176 and then a spine 178 with flexible members 180 extending toward the back end 174. The push-pull boot 122 provides protection for the fiber optic cable 190 that further protects the optical fibers 106 that are terminated in the ferrules 104. The push-pull boot 122 may have other configurations such as a smaller or non-existent solid tubular portion 176 or, alternatively a larger section thereof. The push-pull boot 122 provides more resistance (that is it is more rigid and stiff) in a direction parallel to the longitudinal axis A and is more pliable and flexible in any direction away that takes the back end 174 away from the longitudinal axis A. In fact, in one embodiment of the push-pull boot 122, the pulling on the push-pull boot 122 (away from the front end 172) with a 3.6 N force resulted in an elongation of 0.05 mm. Pushing down on the push-pull boot 122 with a 0.5 N force resulted in a movement of 5.2 mm. Thus, the stiffness or rigidity along the longitudinal axis A is 72 N/mm while the stiffness away from the longitudinal axis 0.1 N/mm. The means that the stiffness along the longitudinal axis is 720 times more than away from the longitudinal axis. This feature of the push-pull boot 122 allows for the insertion into and removal of the fiber optic connector 100 from the adapter 102 without buckling or pinching the fiber optic cable 190, while still protecting the rear ends of the fiber optic connectors 100 while inserted in the adapters 102.

Figure 15:
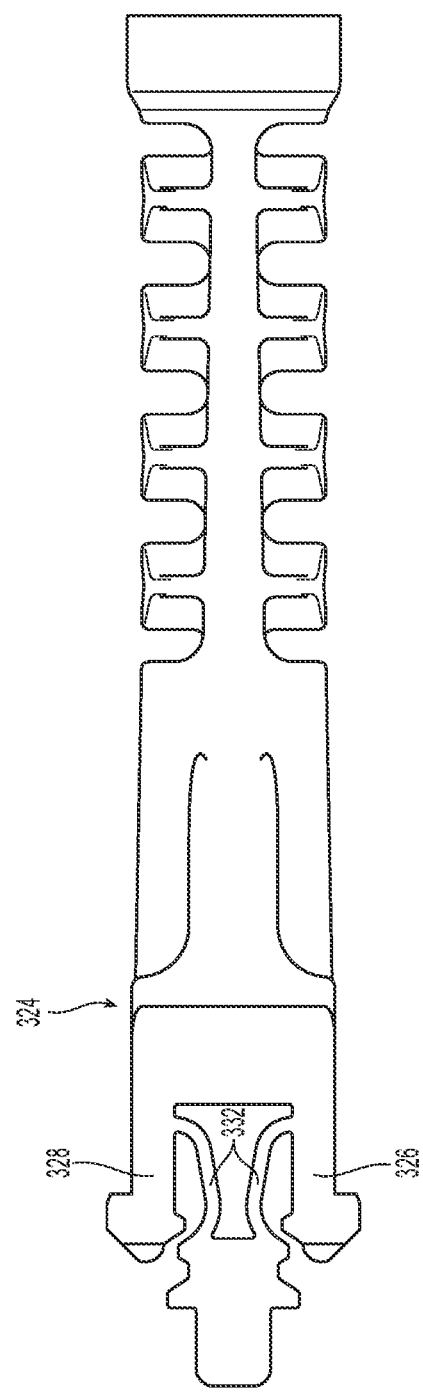
FIG. 15 illustrates a third embodiment of a push-pull boot with a boot latch according to the present invention and the central head member is in a first position relative to the side extensions.

FIGS. 7A-7E illustrate one embodiment of the boot latch 124. Since the boot latch 124 is attached at the front end 172 of the push-pull boot 122, only a portion of the push-pull boot 122 is illustrated in these figures. Specifically, the boot latch 124 connects to the push-pull boot 122 at the solid tubular portion 176. Again, the boot latch 124 has a first side extension 126 and a second side extension 128 and a central head member 130. The central head member 130 has a flat front surface 182, although it could take on any number of shapes. Other either side of the central head member 130 are shoulders 184, which have a forward facing surface and preferably engage the rearward facing surfaces/walls 150 when the boot latch 124 is inserted into the release member 114. Directly behind the shoulders 184 are recesses 186 that receive a complementary structure (inward projections 194) on each of the first side extension 126 and the second side extension 128. The central head member 130 is attached to the first side extension 126 and the second side extension 128 by the flexure members 132. As illustrated in an alternative embodiment of a boot latch 324 in the FIG. 15, the flexure members 332 may be attached to the first side extension 326 and the second side extension 328 in a different location from that shown in FIGS. 7A-7E.

Figure 10:
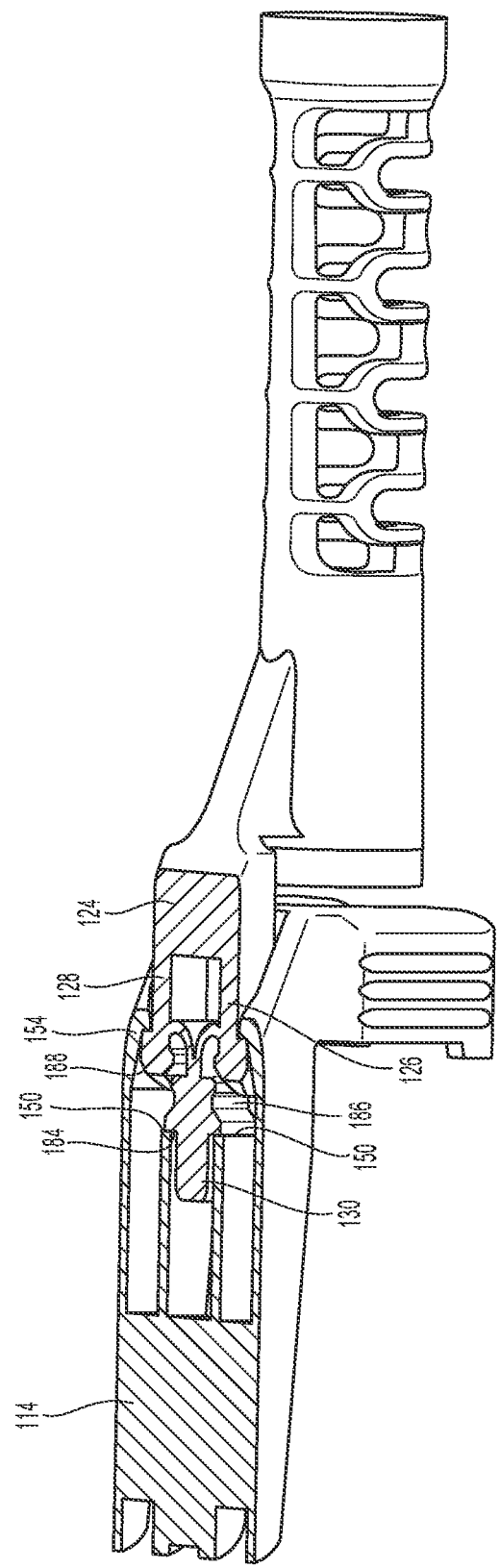
FIG. 10 is a perspective view of the boot latch inserted partially into the release member with the top of the release member removed to show the central head member of the boot latch in a first position relative to the side extensions.

Each of the first side extension 126 and the second side extension 128 have at the ends thereof a side ramped surface 188 on an outside portion. The ramped surfaces 188 are to engage the chamfered surface 152 at the boot latch opening 118. As the boot latch 124 is inserted into the boot latch opening 118, the ramped surfaces 188 engage the chamfered surfaces 152 and cause the first side extension 126 and the second side extension 128 to move toward each other to pass into the boot latch opening 118. Since the central head member 130 is not between the first side extension 126 and the second side extension 128, they can move toward one another to provide space for the boot latch 124 to pass easily. See FIG. 7E. The forward facing surface 154 adjacent to the chamfered surface 152 within the boot latch opening 118 gathers the rearward facing surface 192 that is on the outside of the first side extension 126 and the second side extension 128 rearwardly from the ramped surfaces 188. Thus, as illustrated in FIG. 7E, the central head member 130, which is positioned so that the shoulders 184 are ready to engage the rearward facing surfaces/walls 150, is still in the first position and not between the first side extension 126 and the second side extension 128. See also FIG. 10.

Figure 7C:
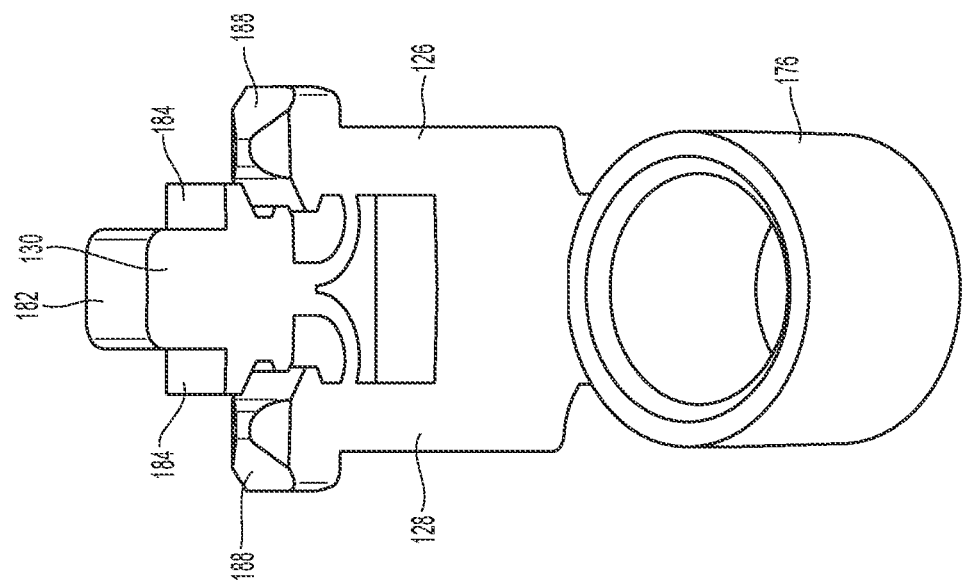
FIG. 7C is a perspective view from under the boot latch that is on the front end of the push-pull boot.
Figure 7E:
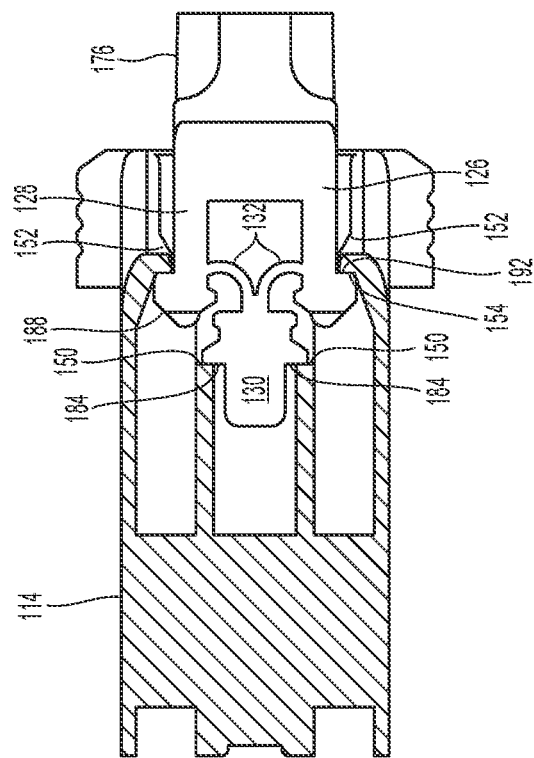
FIG. 7E is a top view of the boot latch inserted into the release member.
Figure 7D:
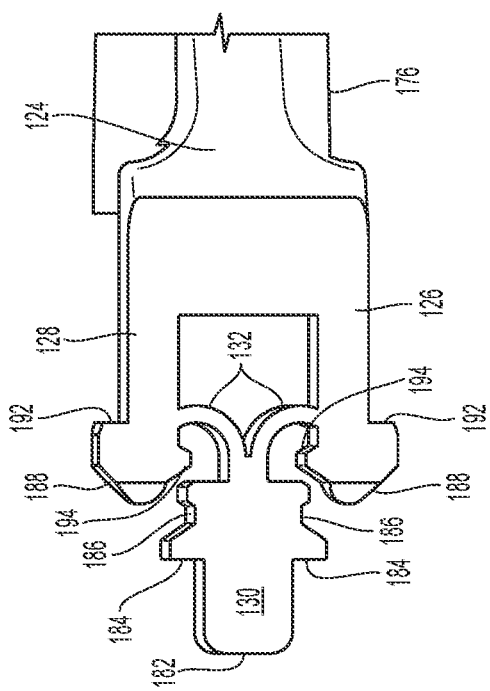
FIG. 7D is top view of the boot latch at the front end of the push-pull boot.
Figure 9:
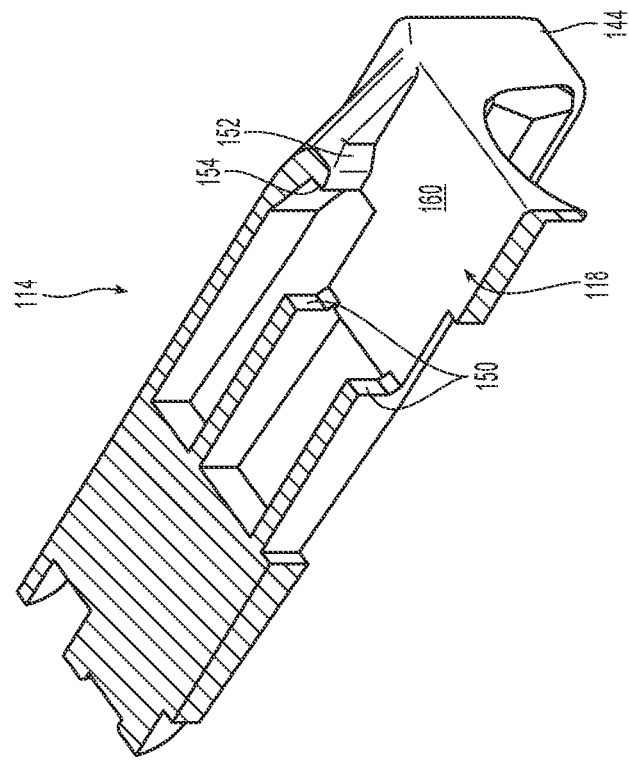
FIG. 9 is top perspective view of a cross section with the top of the release member removed.
Figure 8:
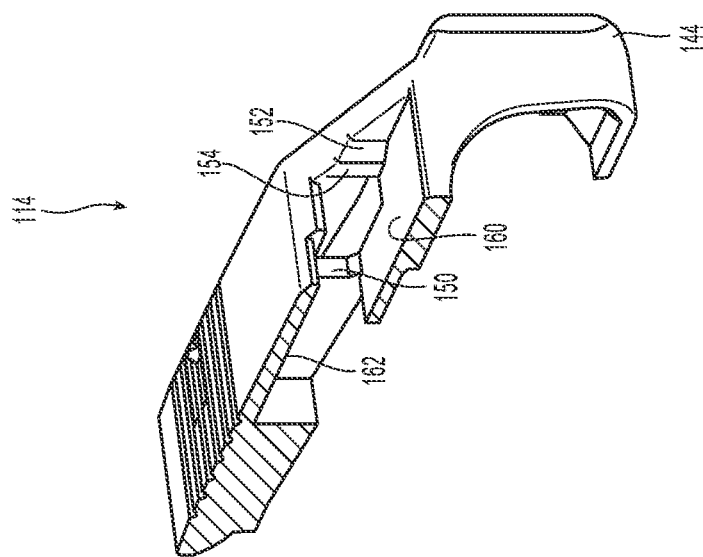
FIG. 8 is a cross sectional view of the release member along a horizontal showing the inside features of the release member.
Figure 11:
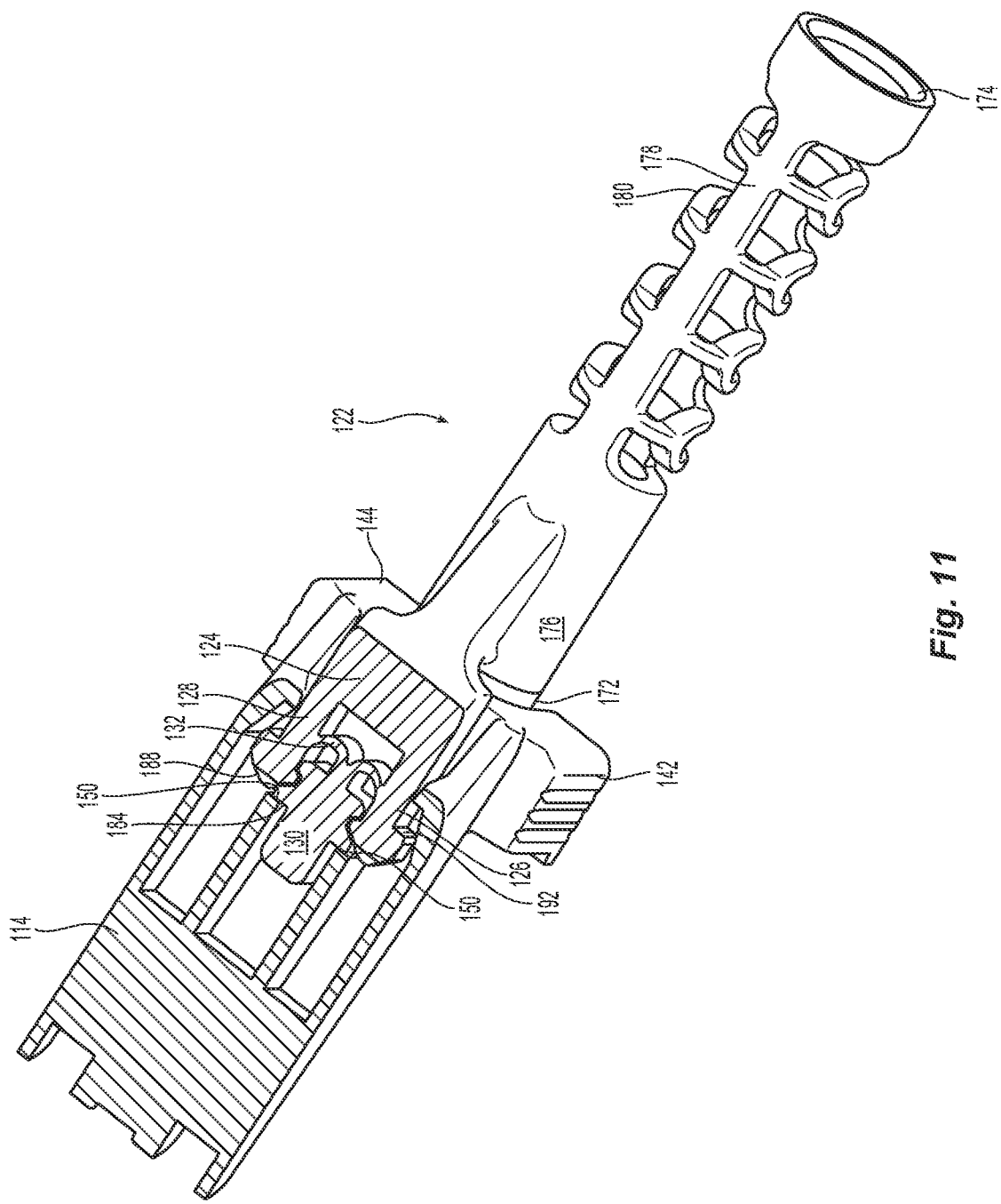
FIG. 11 is a perspective view of the boot latch fully inserted into the release member with the top of the release member removed to show the central head member of the boot latch in a second position relative to the side extensions.
Figure 12:
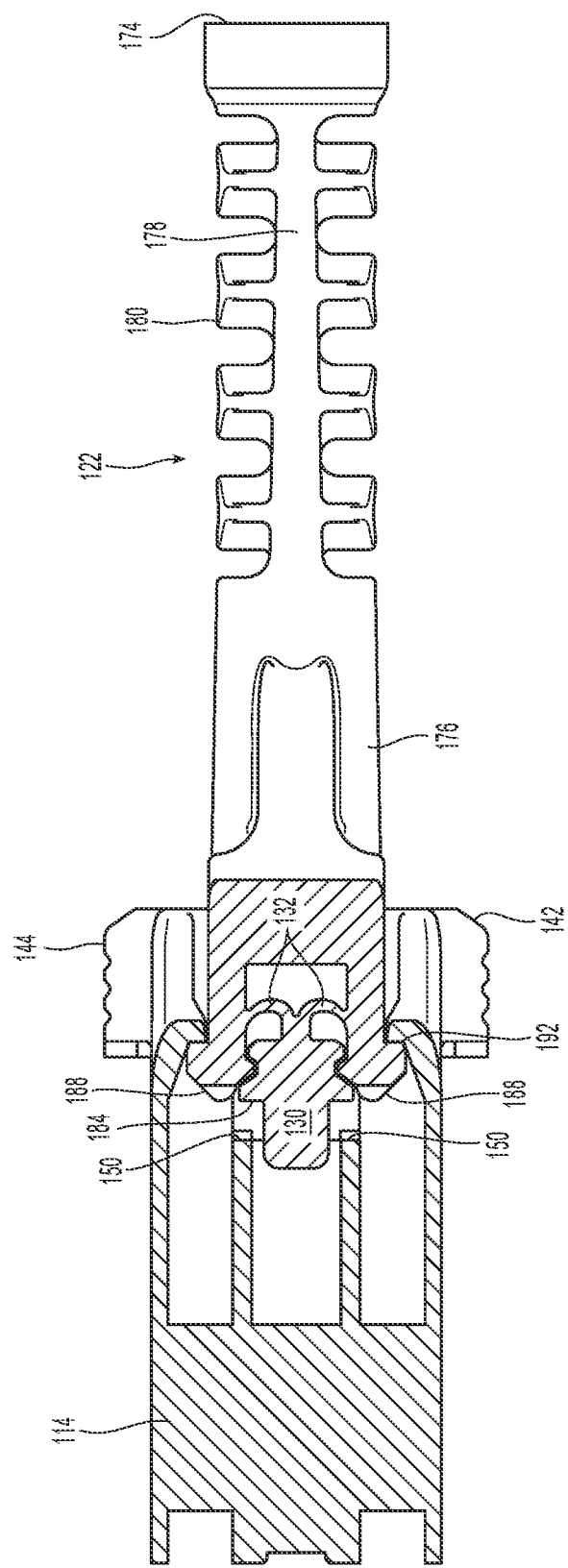
FIG. 12 is a perspective view of the boot latch inserted into the release member with the top of the release member removed to show the central head member of the boot latch in a second position relative to the side extensions and being permanently disposed within the release member.

As best illustrated in FIG. 7A, the first side extension 126 and the second side extension 128 have an inward projection 194 that is disposed within the recesses 186 when the central head member 130 is in the second position (shown in FIG. 12). As such, FIGS. 7A-7E show the central head member 130 in a first position relative to the first side extension 126 and the second side extension 128. As illustrated in FIG. 11, the boot latch 124 has been advanced within the boot latch opening 118, and with the central head member 130 being held in place by the rearward facing surfaces/walls 150, the inward projections 192 are disposed within the recesses 186, preventing the first side extension 126 and the second side extension 128 from being able to move relative to one another. However, it should be noted that in FIG. 10, the rearward facing surface 192 is not contacting the forward facing surface 154 adjacent to the chamfered surface 152 within the boot latch opening 118. However, they do make contact when the push-pull boot 122 is pulled rearwardly relative to the releasing member 114. See FIG. 12.

Figure 13:
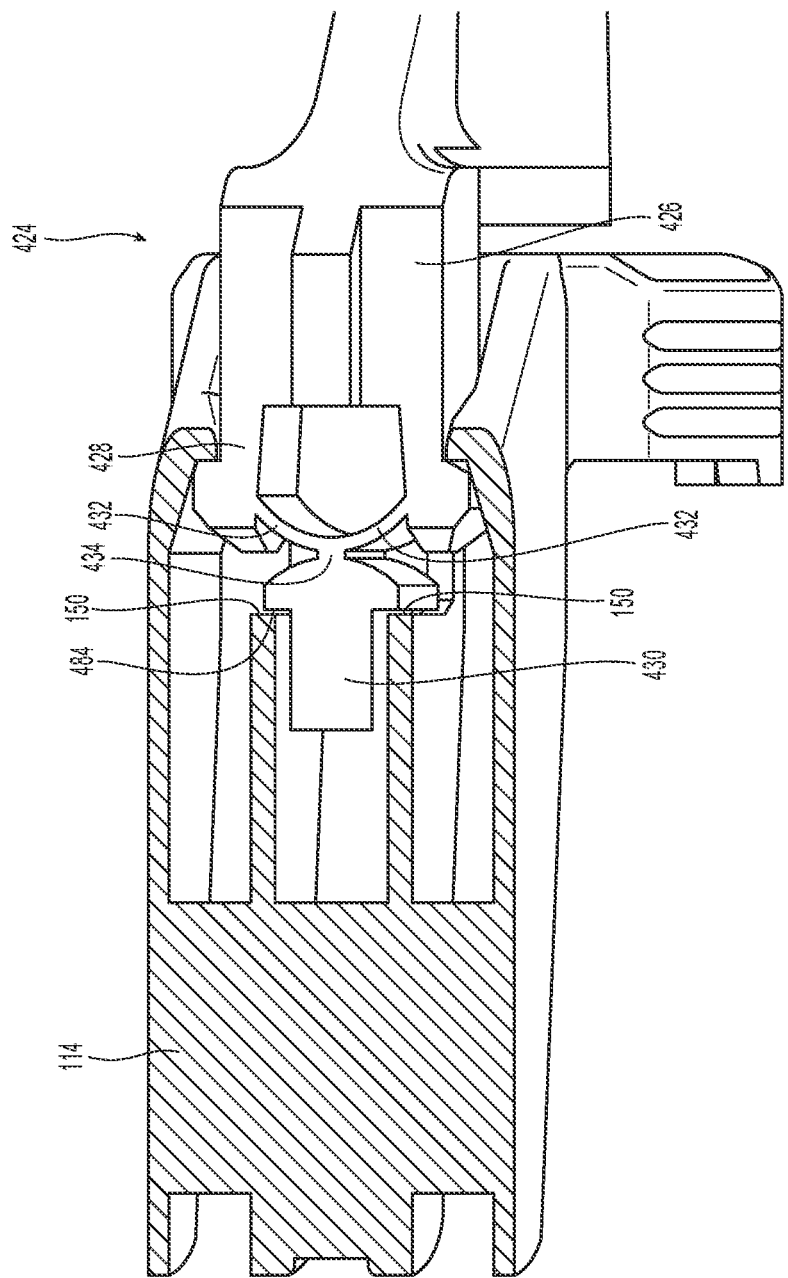
FIG. 13 illustrates a second embodiment of a push-pull boot with a boot latch according to the present invention and the central head member is in a first position relative to the side extensions.
Figure 14:
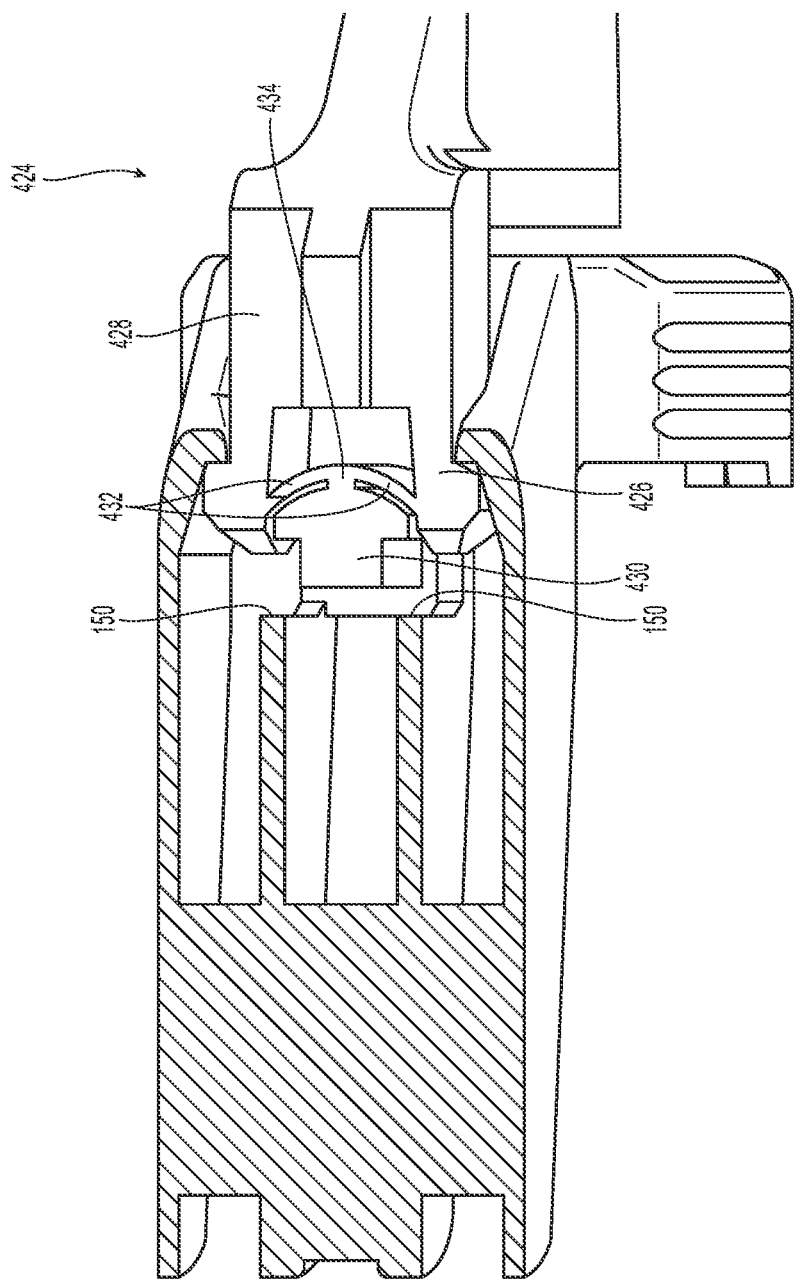
FIG. 14 illustrates the second embodiment of the boot latch in FIG. 13 with the central head member in the second position.

Another embodiment of a boot latch 424 is illustrated in FIGS. 13 and 14. The only difference between boot latch 424 and boot latch 124 is the central head member 430 and flexure members 432 have a different shape. The central head member 430 is connected to the flexure members 432 through a common attachment member 434, rather than directly. The central head member 430 is in the first position in FIG. 13 and in the second position in FIG. 14. As seen in the figures, the boot latch 424 has a first side extension 426 and a second side extension 428 to which the flexure members 432 are connected. The central head member 430 is still positioned with the shoulders 484 against the rearward facing surfaces/walls 150 of the releasing member 114, when in the first position of the central head member 430.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector comprising:
a ferrule configured to support at least one optical fiber;
a plug at least partially surrounding the ferrule;
a connector latch attached to the plug to engage the fiber-optic connector with an adapter or with a receptacle;
a connector body attached to the plug;
a release member attached to the connector body and to the connector latch and having a boot latch opening at a rear end;
a push-pull boot attached to the release member; and
a boot latch attached to the push-pull boot and extending forward and away from the push-pull boot, the boot latch having a first side extension and a second side extension and a central head member connected to and at least partially disposed between the first side extension and the second side extension by at least one flexure member,
wherein the boot latch is permanently disposed within the release member after the boot latch is inserted into the boot latch opening as the central head member engages each of the first side extension and the second side extension preventing removal of the boot latch from the release member when a push force or a pull force is applied to the push-pull boot.

2. The fiber optic connector according to claim 1, wherein the release member has at least one rearward facing surface to engage the central head member when the boot latch is inserted into the release member a predetermined distance.

3. The fiber optic connector according to claim 2, wherein the at least one rearward facing surface engages a shoulder on the central head member.

4. The fiber optic connector according to claim 3, wherein the shoulder on the central head member has a forward facing surface.

5. The fiber optic connector according to claim 1, wherein the boot latch opening has a chamfered surface on each side thereof and the first side extension and the second side extension have a side ramp that engages a respective chamfered surface on the boot latch opening, causing the first side extension and the second side extension to move toward one another as the boot latch is inserted into the opening.

6. The fiber optic connector according to claim 1, wherein the central head member has a recessed portion on opposing sides to receive an inward projection from the first side extension and the second side extension, respectively.

7. The fiber optic connector according to claim 6, wherein the inward projection on each of the first side extension and the second side extension are disposed within the recessed portions thereby preventing the first side extension and the second side extension from moving toward each other when force is applied to the boot latch.

8. The fiber optic connector according to claim 1, further comprising forward facing surfaces on each side of the boot latch opening, the forward facing surfaces engaging a rear stop adjacent terminal ends of the first side extension and the second side extension to prevent the boot latch from being removed from the boot latch opening.

9. A push-pull boot for use with a fiber optic connector having at least one fiber optic ferrule to support at least one optical fiber, the push-pull boot comprising:
a main body having a front end and a back end and defining a longitudinal axis between the front end and the back end; and
a boot latch attached to the main body adjacent the front end of the main body and extending substantially parallel to the longitudinal axis and away from the back end of the main body of the push-pull boot,
wherein the boot latch includes a first side extension and a second side extension and a central head member positioned between the first side extension and the second side extension, and
wherein the first side extension and the second side extension and the central head member are engaged with each other in a locked state, and
wherein upon an application of a rearward force to the push-pull boot to detach the fiber-optic connector from an adapter or a receptacle, the push-pull boot remains in an attached state with the fiber-optic connector.

10. The push-pull boot according to claim 9, wherein the push-pull boot has more rigidity in a direction substantially parallel to the longitudinal axis but has lesser rigidity and is bendable in a direction away from the longitudinal axis.

11. The push-pull boot according to claim 9, wherein the central head member has a recessed portion on opposing sides to receive an inward projection from the first side extension and the second side extension, respectively, and
wherein the inward projection on each of the first side extension and the second side extension are disposed within the recessed portions thereby preventing the first side extension and the second side extension from moving toward each other when force is applied to the boot latch.

12. A combination of a release member and a push-pull boot for a fiber-optic connector, comprising:
a release member removably attachable to a connector latch of the fiber-optic connector, the release member having a boot latch opening; and
a push pull boot attached to a connector body of the fiber-optic connector and configured to support a fiber optic cable containing at least one optical fiber, the push-pull boot having a boot latch attached to a front portion of the push-pull boot and extending forwardly substantially parallel to a longitudinal axis of the push-pull boot,
wherein the boot latch is remains engaged with the release member inside the boot latch opening of the release member when pull forces are applied to the push-pull boot to detach the fiber optic connector from an adapter or a receptacle.

13. A duplex fiber optic connector comprising:
a pair of ferrules each configured to support an optical fiber;
a pair of plugs at least partially surrounding each of respective ones of the pair of ferrules;
a connector latch attached to each plug in the pair of plugs to engage the fiber-optic connector with an adapter;
a connector body attached to the pair of plugs;
a release member attached to the connector body and to the connector latch and having a boot latch opening at a rear end;
a push-pull boot attached to the release member; and a boot latch attached to the push-pull boot and extending forward and away from the push-pull boot, the boot latch having a first side extension and a second side extension and a central head member connected to and at least partially disposed between the first side extension and the second side extension by at least one flexure member, wherein the central head member is in a first position relative to the first side extension and the second side extension before the boot latch is inserted into the release member and the central head member is in a second position relative to the first side extension and the second side extension after the boot latch is inserted into the boot latch opening, the boot latch being retained in the release member as the central head member engages each of the first side extension and the second side extension preventing the boot latch from passing through the boot latch opening in the release member when push or pull forces are applied to the push-pull boot after the boot latch is inserted into the boot latch opening substantially along a longitudinal axis.

14. The duplex fiber optic connector according to claim 13, wherein the release member has at least one rearward facing surface to engage the central head member when the boot latch is inserted into the release member a predetermined distance.

15. The duplex fiber optic connector according to claim 14, wherein the at least one rearward facing surface engages a shoulder on the central head member.

16. The duplex fiber optic connector according to claim 15, wherein the shoulder on the central head member has a forward facing surface.

17. The duplex fiber optic connector according to claim 13, wherein the boot latch opening has a chamfered surface on each side thereof and the first side extension and the second side extension have a side ramp that engages a respective chamfered surface on the boot latch opening, causing the first side extension and the second side extension to move toward one another as the boot latch is inserted into the opening.

18. The duplex fiber optic connector according to claim 13, wherein the central head member has a recessed portion on opposing sides to receive an inward projection from the first side extension and the second side extension, respectively.

19. The duplex fiber optic connector according to claim 18, wherein the inward projection on each of the first side extension and the second side extension are disposed within the recessed portions thereby preventing the first side extension and the second side extension from moving toward each other when force is applied to the boot latch.

20. The duplex fiber optic connector according to claim 13, wherein the push-pull boot has a spine extending substantially parallel to a portion of the longitudinal axis and a plurality of flexible members connected to the spine, the push-pull boot bendable in a direction away from the longitudinal axis.

* * * * *